United States Patent
Byun et al.

(10) Patent No.: US 10,187,862 B2
(45) Date of Patent: Jan. 22, 2019

(54) METHOD AND APPARATUS FOR PERFORMING TIMING SYNCHRONIZATION IN WIRELESS COMMUNICATION SYSTEM

(71) Applicant: LG ELECTRONICS INC., Seoul (KR)

(72) Inventors: Ilmu Byun, Seoul (KR); Jaehoon Chung, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 354 days.

(21) Appl. No.: 14/895,147

(22) PCT Filed: May 8, 2014

(86) PCT No.: PCT/KR2014/004078
§ 371 (c)(1),
(2) Date: Dec. 1, 2015

(87) PCT Pub. No.: WO2014/196741
PCT Pub. Date: Dec. 11, 2014

(65) Prior Publication Data
US 2016/0112977 A1 Apr. 21, 2016

Related U.S. Application Data

(60) Provisional application No. 61/830,153, filed on Jun. 2, 2013.

(51) Int. Cl.
*H04W 56/00* (2009.01)
*H04L 5/00* (2006.01)
(Continued)

(52) U.S. Cl.
CPC ....... *H04W 56/0015* (2013.01); *H04L 5/0032* (2013.01); *H04L 5/0069* (2013.01); *H04W 72/082* (2013.01); *H04W 76/14* (2018.02)

(58) Field of Classification Search
CPC ............. H04J 3/0635; H04J 3/0638; H04B 7/2671–7/2681; H04B 7/2696;
(Continued)

(56) References Cited

U.S. PATENT DOCUMENTS

2011/0171949 A1* 7/2011 Liao ............... H04W 56/0045
455/422.1
2013/0272196 A1* 10/2013 Li ..................... H04W 72/044
370/328
(Continued)

FOREIGN PATENT DOCUMENTS

KR 10-2011-0128331 A 11/2011
KR 10-2012-0074254 A 7/2012
(Continued)

*Primary Examiner* — Andrew W Chriss
*Assistant Examiner* — Kenan Cehic
(74) *Attorney, Agent, or Firm* — Birch, Stewart, Kolasch & Birch, LLP

(57) ABSTRACT

The present invention provides an apparatus and a method for performing timing synchronization in a wireless communication system. Particularly, the present invention is characterized in that resources for D2D communication and resources for performing cellular communication are identified, and resource information for the D2D communication is determined considering the number of D2D terminals and a cell size of a base station, has different frequency and time domains according to D2D terminals, and includes different time offset values. Accordingly, the present invention prevents, in advance, the generation of interference according to the D2D communication.

13 Claims, 14 Drawing Sheets

(51) Int. Cl.
*H04W 72/08* (2009.01)
*H04W 76/14* (2018.01)

(58) Field of Classification Search
CPC . H04W 56/00; H04W 56/001; H04W 56/002; H04W 56/0025
See application file for complete search history.

(56) References Cited

U.S. PATENT DOCUMENTS

| | | | | |
|---|---|---|---|---|
| 2014/0003262 | A1* | 1/2014 | He | H04W 28/08 370/252 |
| 2014/0016574 | A1* | 1/2014 | Seo | H04W 76/023 370/329 |
| 2014/0023008 | A1* | 1/2014 | Ahn | H04W 76/023 370/329 |
| 2014/0057670 | A1 | 2/2014 | Lim et al. | |
| 2014/0064263 | A1* | 3/2014 | Cheng | H04W 8/005 370/350 |
| 2014/0355557 | A1 | 12/2014 | Peng et al. | |
| 2015/0023343 | A1* | 1/2015 | Ohta | H04W 56/0045 370/350 |
| 2017/0086140 | A1* | 3/2017 | Xu | H04W 52/0225 |

FOREIGN PATENT DOCUMENTS

| | | |
|---|---|---|
| KR | 10-1165176 B1 | 7/2012 |
| KR | 10-2013-0035964 A | 4/2013 |
| WO | WO 2009/009572 A3 | 1/2009 |
| WO | WO 2010/101939 A3 | 9/2010 |
| WO | WO 2012/150815 A2 | 11/2012 |
| WO | WO 2012/166969 A1 | 12/2012 |
| WO | WO 2013/075340 A1 | 5/2013 |

* cited by examiner

METHOD AND APPARATUS FOR PERFORMING TIMING SYNCHRONIZATION IN WIRELESS COMMUNICATION SYSTEM

CROSS REFERENCE TO RELATED APPLICATIONS

This application is the National Phase of PCT International Application No. PCT/KR2014/004078, filed on May 8, 2014, which claims priority under 35 U.S.C. 119(e) to U.S. Provisional Application No. 61/830,153, filed on Jun. 2, 2013, all of which are hereby expressly incorporated by reference into the present application.

BACKGROUND OF THE INVENTION

Field of the Invention

The present invention relates to a wireless communication system, and more particularly, to a method and apparatus for performing timing synchronization in a wireless communication system supporting communication between user equipments (UEs).

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Meanwhile, in consideration of the requests of service provider that provides services to users, seek the benefit from the improvement of performances of the existing radio access or network and the way of recouping the investment costs for wireless communication systems which have been already invested so that the LTE system has been evolved in the form of maintaining or coexisting the compatibility with 2G communication system, which is the global system for mobile communications (GSM) based on the time division multiple access (TDMA), and with 3G communication system, which is the universal mobile telecommunication system (UMTS) based on the wideband code division multiple access (W-CDMA).

Particularly, with the advent of smart phones and tablet personal computers (PCs) recently, the users of actual communication devices require the services that enable you to easily obtain or share the information desired at any place and any time they want. However, it is not easy to effectively provide real-time information that is trivial but useful for users in real life situation due to the complexity of system or time delay of the wireless communication systems.

However, up to now, the wireless communication system cannot efficiently provide trivial valuable real time information for the user in a real living space due to a complexity of the system or time delay. Meanwhile, a device to device (D2D) service through a direct communication link between communication UEs is introduced without passing through a network object such as a base station. That is, there is a strong need to suggest, develop/improve a communication technology to support an environment capable of sharing and acquiring various information of users in a wireless communication system environment.

Accordingly, there is a need for an efficient data transmission/reception scheme with respect to a UE to support a service by configuring a link with a base station and UEs to support D2D service in the wireless communication system. Further, there is a need to allocate an efficient resource for minimizing interference upon transmission/reception of data between UEs.

SUMMARY OF THE INVENTION

The present invention provides a method and apparatus for providing synchronization for a device-to-device communication service in a wireless communication system.

The present invention also provides a method and apparatus for allocating a synchronization signal supporting a device-to-device communication service in a wireless communication system.

The present invention also provides a method and apparatus for performing timing synchronization for supporting a device-to-device communication service in a wireless communication system.

According to one aspect of the present invention, there is provided a method for performing timing synchronization in a wireless communication system The method includes: transmitting user equipment (UE) capability information comprising an ability of supporting device to device (D2D) communication; receiving resource information allocated by being distinguished for a cellular UE and the D2D UE from an evolved NodeB (eNB); transmitting a synchronization signal in at least one symbol location among first and last symbols of a corresponding resource block by using the received resource information; and acquiring synchronization between the D2D UEs by using the synchronization signal, wherein the resource information for the D2D UE is determined by considering the number of the D2D UEs and a cell size of the eNB, has different frequency and time domains for each D2D UE, and comprises a different time offset value.

According to another aspect of the present invention, there is provided an apparatus for performing timing synchronization in a wireless communication system. The apparatus includes: a radio frequency (RF) unit for transmitting/receiving a radio signal; and a processor coupled to the RF unit to determine allocated resource information, wherein the processor is configured for: transmitting UE capability information comprising an ability of supporting D2D communication; receiving resource information allocated by being distinguished for a cellular UE and the D2D UE from an eNB, and transmitting a synchronization signal in at least one symbol location among first and last symbols of a corresponding resource block by using the received resource information; and acquiring synchronization between the D2D UEs by using the synchronization signal, wherein the resource information for the D2D UE is determined by considering the number of the D2D UEs and a cell size of the eNB, has different frequency and time domains for each D2D UE, and comprises a different time offset value.

Since interference on each UE is predicted when a device-to-device communication service is provided, there is an advantage in that synchronization is preformed more accurately. Further, since resource information for synchronization is shared when an initial procedure is performed for D2D communication, the synchronization is achieved more rapidly, and thus an effective device-to-device communication service is supported. Therefore, system performance deterioration caused by inter-symbol interference for each UE supporting a different service is prevented, thereby maximizing system performance.

DESCRIPTION OF EXEMPLARY EMBODIMENTS

Hereinafter, some embodiments of the present invention are described in detail with reference to the accompanying drawings. The same reference denotations are used to refer to the same or substantially the same elements throughout the specification and the drawings. When determined to make the subject matter of the present invention unclear, the detailed description of known configurations or functions is omitted.

The description of the disclosure targets communication networks. The task by a communication network may be done while a system (e.g., a base station) in charge of the communication network controls the network and performs data transmission, or such task may be conducted by a user equipment linked with the network.

Figure 1:
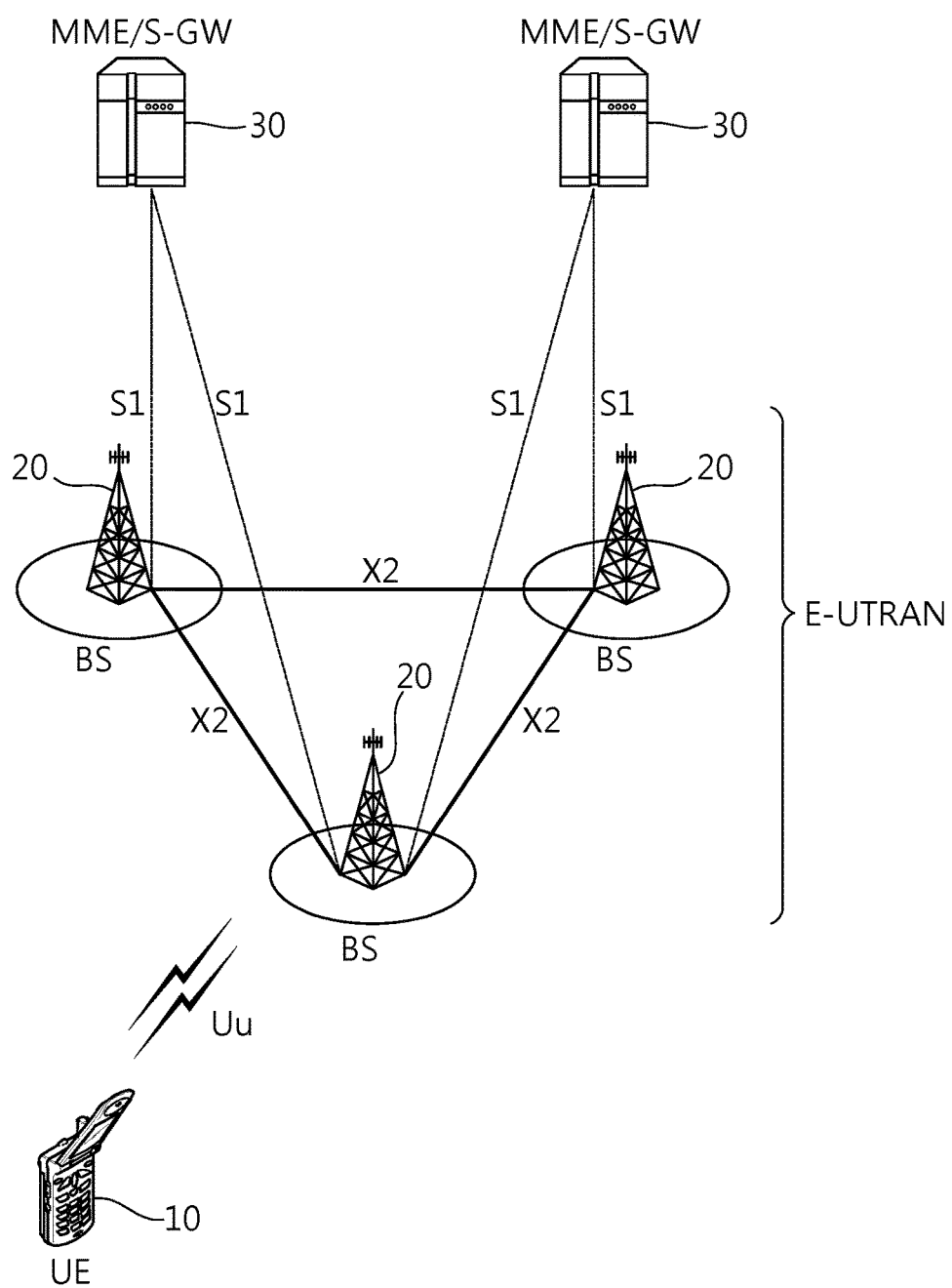
FIG. 1 schematically illustrates a structure of a wireless communication system to which the present invention is applied.

FIG. 1 schematically illustrates a structure of a wireless communication system to which the present invention is applied. The drawing depicts a network structure of evolved-universal mobile telecommunications system (E-UMTS). The E-UMTS system is also called long term evolution (LTE) or LTE-advanced (LTE-A) system, and refers to a packet based system to provide various communication services such as voice, packet data, and so on.

Referring to FIG. 1, the E-UTRAN includes an evolved-NodeB (eNB) 20 that provides a control plane and a user plane for user equipments (UEs) 10. The UEs 10 may be fixed or have mobility, and may be called other terms such as a mobile station (MS), an advanced mobile station (AMS), a user terminal (UT), a subscriber station (SS), a wireless device, and the like.

The eNB 20 generally refers to a station that communicates with the UEs 10 and may be called other terms such as a base station (BS), a base transceiver system (BTS), an access point (AP), a femto eNB, a pico-eNB, a Home nodeB, relay, and so on. The eNB 20 may provide services for a UE through at least one cell. The cell may signify a geographical region that provides communication service by the eNB 20, or signify a specific frequency band. Or, the cell may signify downlink frequency resources and uplink frequency resources. Or, the cell may signify the combination of the downlink frequency resources and optional uplink frequency resources. In addition, the cell should be interpreted as inclusive meaning that represents a partial region which is covered by the eNB 20. And the cell may be defined as a mega cell, a macro cell, a micro cell, a pico cell, a femto cell, etc. according to the size, and the cell should be interpreted as inclusive meaning that includes all of various coverage and regions according to the present invention.

Hereinafter, downlink refers to transmission link from the eNB 20 to the UEs 10 and uplink refers to transmission link from the UEs 10 to the eNB 20. In downlink, a transmitter may be a part of the eNB 20 and a receiver may be a part of the UEs 10. In uplink, a transmitter may be a part of the UEs 10, and a receiver may be a part of the eNB 20.

Various multi access methods may be used such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA in the present invention. In addition, as the uplink transmission and the downlink transmission, a Time Division Duplex (TDD) scheme transmitted using different times may be used. Or, a Frequency Division Duplex (FDD) scheme transmitted using different frequencies may be used.

Herein, the CDMA may be implemented with a radio technology such as universal terrestrial radio access (UTRA) or CDMA2000. The TDMA may be implemented with a radio technology such as global system for mobile communications (GSM), general packet ratio service (GPRS), enhanced data rate for GSM evolution (EDGE), etc. The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

The eNBs 20 are interconnected by means of an X2 interface. The eNBs 20 are also connected by means of an S1 interface to an evolved packet core (EPC) 30, more specifically, to a mobility management entity (MME) through S1-MME and to a serving gateway (S-GW) through S1-U. The S1 interface exchanges operation and management (OAM) information for supporting movement of the UE 10 by exchanging a signal with the MME. For convenience of explanation, it is assumed that the present invention applies to 3GPP LTE/LTE-A. However, technical features of the present invention are not limited thereto. For example, although a mobile communication system is described in detail hereinafter on the basis of a mobile communication system corresponding to a 3GPP LTE/LTE-A system, the present invention is also applicable to any other mobile communication systems except for an aspect unique to 3GPP LTE/LTE-A. Further, to avoid conceptual ambiguity of the present invention, well-known structures and apparatuses can be omitted, or a block diagram can be illustrated by focusing on a core function of each structure and apparatus. Furthermore, like reference numerals are used to indicate like elements throughout the present invention.

Meanwhile, in a case of the LTE system, a high transmission rate is provided to a user by providing an effect logically using one great band by physically binding a plurality of continuous or non-continuous bands in a frequency domain. A technology of using one logical great band by binding a plurality of bands refers to carrier aggregation (CA). Schemes for satisfying a service request of the user by using a plurality of bands for one service or by supporting a service by discriminating respective bands in order to support a corresponding service or using each band by discriminating data and control information.

For example, it is assumed that the eNB 20 can support N downlink CCs, and the UE can support a service through M downlink CCs according to its capability information. In this case, a frequency bandwidth corresponding to L downlink CCs may be set as a main CC. The UE may receive data transmitted through the main CC by preferentially monitoring the data. That is, one CC may be identified according to a cell, and if CA is performed by using a CC of a primary cell (Pcell) and a CC of a secondary cell (Scell), among carriers used in a downlink and an uplink, the CC of the Pcell may be called a primary cell component carrier (PCC), and the CC of the Scell may be called a secondary cell component carrier (SCC).

The UE may perform a radio resource control (RRC) connection through the PCC of the Pcell. In addition, the UE may attempt a random access to the eNB through a physical random access channel (PRACH) on the basis of a signal signaled through the PCC. That is, the UE may perform an initial connection establishment process or a connection re-establishment process with respect to the eNB through the PCC in a CA environment.

Meanwhile, the SCC as the Scell may be used to provide an additional radio resource. In order to perform CA for adding the SCC to the PCC, the UE must perform a neighbor cell measurement for acquiring information on a neighbor cell. The eNB may determine whether to aggregate the SCC to the PCC on the basis of the neighbor cell measurement performed by the UE. The Pcell is a carrier which is always activated. The Scell may operate according to an activation/deactivation indication of the eNB. The activation/deactivation may be indicated in a format of a MAC message. Further, in the Pcell, the legacy subframe may be transmitted through the PCC, and in the Scell, not to mention the use of the legacy subframe through the SCC to be described below, it is possible to transmit a control channel transmitted in the legacy subframe and a subframe of a new format in which transmission is performed by effectively decreasing reference signals. That is, the subframe of the new format may be defined and used in a new LTE-A release. Hereinafter, for easy explanation. a newly defined subframe, i.e., a subframe of a new format different from the legacy subframe, may be defined as a new subframe or an extension subframe.

Figure 2:
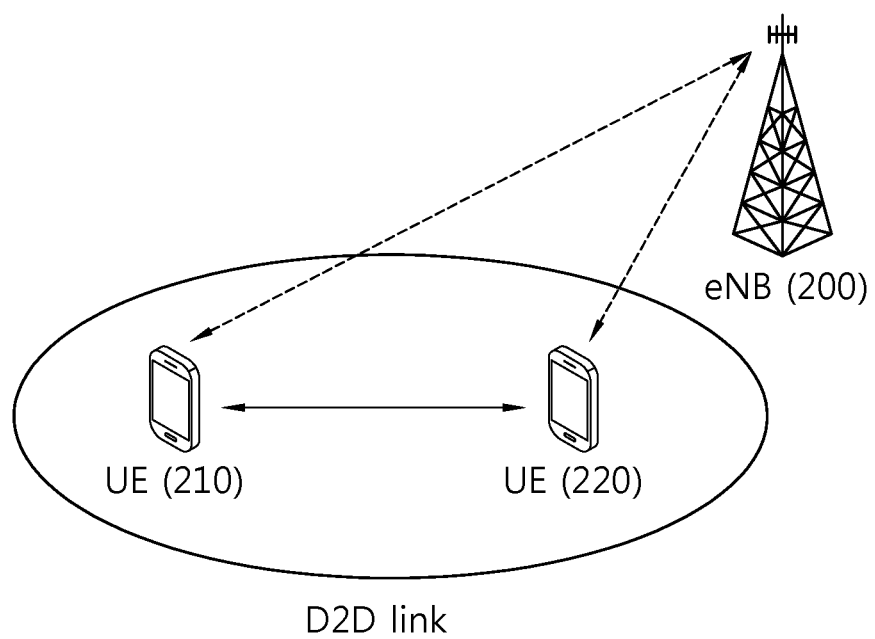
FIG. 2 illustrates the concept for device-to-device communication according to the present invention.

FIG. 2 illustrates the concept for UE-to-UE communication according to the present invention.

Referring to FIG. 2, device-to-device communication or D2D communication means communication for performing direct transmission and reception between the UEs without a relay of an eNB. In the legacy communication system, the UEs always perform communication with the eNB. In comparison thereto, in the D2D communication system according to the present invention, if direct communication between the UEs is possible, for example, if the UEs are geographically close to each other or if a channel state between the UEs is excellent, a control for real UEs is still achieved by the eNB (dotted line), whereas real data (or a control (e.g., HARQ) associated with the real data or network management/control information of the UE or between the UEs) is achieved by direct communication (solid line) between the UEs.

That is, in order to configure a direct link between at least two UEs wanting communication, the eNB instructs to perform D2D communication between two UEs and actually allocates a predetermined resource for D2D communication between the UEs, and reports this to the two UEs (or exchanges information associated with the UE by determining a primary UE, and communication between the UEs may be achieved through the primary UE). The UEs directly exchange real data by not passing through the eNB under the instruction of the eNB. Herein, all communication may be achieved in D2D communication between UEs. However, it is preferable to transmit and receive only real data and only minimum control associated therewith, and to continuously transmit and receive necessary control with the eNB. Hereinafter, the performing of the D2D communication according to the present invention is not to exclude connection and communication with the eNB.

That is, direct comm. request/response information, scheduling information (resource allocation information), security information, and information necessary to perform D2D communication between UEs (information on which method is used from various D2D communication candidates, and overall physical/mac related parameters including parameters specifying D2D communication (e.g., max. power, coverage, data rate, MCS, MIMO scheme/mode, antenna configuration, Frame Structure, subframe configuration) regulating D2D communication) may be exchanged between UE(s) performing D2D communication with the eNB before D2D communication between the UEs. If necessary, specific control information may be exchanged between the eNB and the UE(s) during D2D communication between the UEs. In this case, although characteristics between the UEs are described, a member may include a node serving as a controller such as a relay. The member may be a part of a kind of a local network such as nodes having representation of an ad hoc network.

In the D2D communication according to the present invention, since direct communication is achieved between the UEs, a load of the eNB can be decreased. Further, transmission power can be decreased, and a frequency reuse rate can be increased. That is, there is an advantage in that limited resources can be efficiently used. In addition, from an aspect of the transmission power, if a distance between the UEs is close, communication is performed with low power instead of sending and receiving traffic to an eNB located in a far distance, and thus it is more efficient from a UE perspective. That is, since communication is performed with low power, several D2D links can simultaneously perform communication in the same cell, thereby increasing the frequency reuse rate.

Meanwhile, the D2D communication according to the present invention considers D2D transmission based on an LTE protocol, and considers a method for allocating and scheduling a resource on the basis of the eNB. That is, the eNB has a control right for a resource allocation of each D2D connection. Herein, information of the scheduled resource is reported to D2D UEs through L1/L2 signaling such as a PDCCH. That is, UEs 201 and 202 (i.e., UE1 and UE2) directly exchange data by using the allocated resource under the instruction of an eNB 200. Herein, although all communication may be achieved in D2D communication between the UEs, transmission of actual data and transmission/reception of minimum control information related to the data may be achieved between the UEs, and control information and data transmission/reception of the eNB 200 may be optionally supported.

Meanwhile, $N_{RB}$ which is the number of resource blocks included in a downlink slot to which the present invention is applied may be determined according to a downlink transmission bandwidth determined in a cell. For example, in the LTE system, $N_{RB}$ may be any one value in the range of 6 to 110 according to a transmission bandwidth in use. One resource block may include a plurality of subcarriers in a frequency domain. Herein, each element on a resource grid is referred to as a resource element (RE). Each RE may be identified by an index pair (k,l). Herein, k(k=0, . . . , $N_{RB}$×12−1) denotes a subcarrier index in the frequency domain, and l(l=0, . . . , 6) denotes an OFDM symbol index in a time domain. That is, one resource block may include 7×12 REs consisting of 7 OFDM symbols in the time domain and 12 subcarriers in the frequency domain.

Further, the number of OFDM symbols included in one slot may have a different value depending on a CP as described above. Furthermore, the number of resource blocks included in one slot may vary depending on a size of a full frequency bandwidth.

As described above, when considering D2D transmission based on the LTE protocol, there is a communication method in which a D2D link is established by achieving timing synchronization between a UE and an eNB and there is also a communication method in which the D2D link is established without being synchronized with the eNB.

When performing communication by achieving the timing synchronization with the eNB, inter symbol interference (ISI) may occur due to a presence of a propagation delay between UEs belonging to the D2D link and a propagation delay between the UE and the eNB. By considering this problem, the present invention provides a frame structure considering the ISI and a synchronization setup procedure. First, a basic resource allocation process with respect to the eNB is described in brief.

Figure 3:
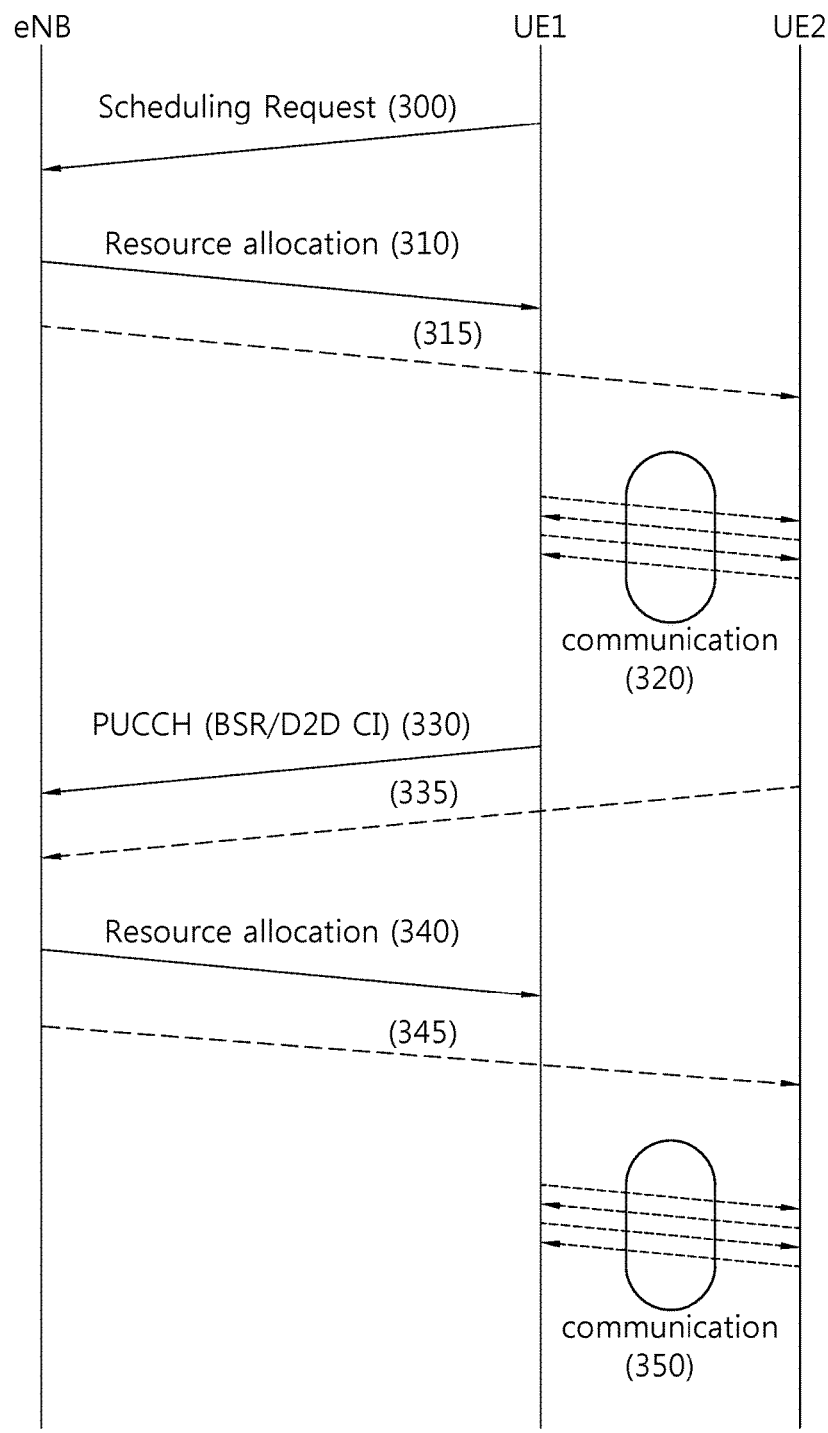
FIG. 3 is a flowchart illustrating signaling for performing device-to-device communication according to the present invention.

FIG. 3 is a flowchart illustrating signaling for performing D2D communication according to the present invention.

Referring to FIG. 3, a UE1 requests an eNB to communicate with a UE2 (step 300). The request may be requested by the eNB to the UE1, or may be requested directly by the UE1 to another UE. Further, a configuration of transmitting data between the UEs without a contention-based request similarly to the aforementioned request is also included.

The eNB allocates a downlink, uplink, or downlink/uplink resource (or bandwidth or grant) for the D2D communication to the UE1 and the UE2 (steps 310 and 315). Herein, in steps 310 and 315, a procedure in which the eNB inquires a D2D intention of the UE2 to send a result thereof to the UE1 as a response thereto may be added. Alternatively, the UE2 may request the eNB to perform communication with the UE1 in step 300, thereby omitting a step of inquiring and responding the D2D intention to the UE2.

In addition, signaling for D2D communication may include an indication for D2D or the like. That is, whether the D2D communication is possible may be indicated in an on/off manner. Herein, the indication on the D2D may include specific UE information requested by the UE1, or may be indicated such that information regarding candidate UE(s) capable of communicating with the UE1 is included and an on/off indicator regarding whether D2D communication is possible for each UE is selectively included.

Meanwhile, resource allocation for the UE1 and the UE2 may be independently signaled to each UE, and may be solved by common signaling. Further, in the resource allocation, a resource is included which is configured with a frequency or time for D2D communication for the UE 1 and the UE2 or a combination of the frequency and the time. Furthermore, in the resource allocation, resources may be allocated by being separated with a symbol having a length determined to avoid inter-symbol interference based on D2D communication, or a resource for the D2D communication and a resource for cellular communication may be allocated alternately with each other. Alternatively, a resource including a guard symbol having a length determined by considering a time delay or cell interference may be allocated as the resource for the D2D communication. That is, according to the present invention, the eNB may confirm a plurality of service available UEs in a cell, and may identify a UE supporting the D2D communication and a UE supporting the cellular communication through UE capability information of each of the confirmed UE. Further, an identified resource for D2D communication may be allocated to the identified UE. A frame structure of transmitting the D2D uplink symbol will be described below in greater detail with reference to FIG. 4 to FIG. 9.

Accordingly, the UE 1 and the UE 2 perform direct communication through the allocated resource (step 320). In this case, the D2D UEs perform data transmission/reception without a control (or intervention) of the eNB. That is, direct communication between the UEs is performed while minimizing unnecessary communication of the eNB. As described above, communication time/order and UL/DL time/order of the UE 1 and the UE 2 with the eNB, communication time/order and UL/DL time/order between UEs are simply illustrated for the purpose of convenience. This may be changed according to scheduling of the eNB, a state of each UE, and a transmission amount of each UE. Further, signals such as additional control, measurement, or the like may be transmitted and received between the UE and the eNB, and between UEs.

Meanwhile, additionally, the UE1 (or UE2) may transmit a D2D uplink symbol through some resources among resources allocated by the eNB for D2D communication (steps 330 and 335). Hereinafter, steps 330 to 350 may be optionally omitted. This means that minimum control information is transmitted from the UE to the eNB for effective avoidance of ISI or the like between D2D communication symbols or between a D2D communication symbol and a cellular communication symbol, that is, for effective scheduling of the eNB. The D2D uplink symbol is a symbol transmitted from the UE1 to the eNB to avoid interference between a symbol for D2D communication and a symbol for cellular communication, among symbols allocated for D2D communication by the eNB. That is, since uplink transmission to the eNB is performed in a subframe (or frequency band (subcarrier)/OFDM symbols) for D2D communication, the D2D uplink symbol does not actually act as interference from a perspective of another D2D communication symbol, and can be transmitted to the eNB. Alternatively, in step 310 (or 315), the resource allocation for the UE1 and the UE2 may include resource allocation for uplink transmission for transmitting uplink control information for D2D communication with the eNB by the UE.

According to one embodiment of the present invention, the D2D uplink symbol may include uplink control information as follows.

Information for reporting a D2D communication status to the eNB may be included. Information on the D2D communication status may include: a) information indicating whether to continue D2D communication; or b) information necessary to allocate a D2D resource.

Herein, in the case a), the information indicating whether to continue the D2D communication may include information on a buffer status regarding D2D communication and information on a start/end of D2D communication. Further, the start/end of the D2D communication may be inferred through a BSR for the D2D communication. Herein, if a plurality of D2D links are established to a corresponding UE, BSR information corresponding to each D2D link and the information on the start/end may be transmitted.

In the case b), as the information necessary to allocate the D2D resource, if a resource for a D2D link is determined by the eNB, information on a channel currently in use and for which the D2D link is configured or status information of a channel for a candidate link for which the D2D link can be configured may be included. A channel quality indicator (CQI), a preceding matrix index (PMI), a rank indicator (RI), etc., for predicting the downlink channel quality may be included. For another example, a sounding reference signal (SRS) may be transmitted through an uplink channel by the UE1 and an uplink channel state may be recognized from the SRS by the eNB, and thereafter, the D2D resource may be scheduled. Alternatively, information for requesting a resource of the D2D link may be received from the UE by the eNB. If request information for the D2D link is received by the eNB and a requested resource is accepted, the resource may be allocated by including information of a time and frequency resource to which the D2D link intends to be changed.

Further, information for reporting the D2D communication status to the eNB may be used in a handover request procedure. If a D2D UE is in a state of a connected mode with respect to the eNB, the D2D communication status is allowed to be transmitted to the eNB in all or some steps of the handover procedure, so as to persistently support D2D communication. Meanwhile, if the D2D UE is in an idle state with respect to the eNB, in case of performing a cell (re)selection procedure, transmission may be performed by including information on the eNB to which the UE belongs or a management result or the like for the D2D link. That is, transmission is performed to the eNB by including a management result of the D2D link measured through the handover procedure or a neighbor D2D link or information for predicting a channel state. In this case, it may be transmitted to the eNB through the allocated D2D resource.

Meanwhile, information for switching from D2D communication to cellular communication may be further included. For example, a reference signal (RS) may be used to track a channel state between the UE and the eNB, and thereafter it may be determined to switch from the D2D communication to communication passing through the eNB. Further, the D2D communication may be controlled to be stopped/continued by estimating an uplink channel state through the SRS.

Further, a transmission period of a D2D uplink symbol may be additionally determined, so that the UE is allowed to alternately transmit channel information for D2D communication and channel information for cellular communication. In this case, since the channel information for D2D communication and the channel information for cellular communication are alternately transmitted, transmission may be achieved without an additional indication (signaling) for distinguishing this. Alternatively, since the D2D uplink symbol is transmitted through a resource for D2D communication, the eNB may distinguish the D2D uplink control information from uplink control information for cellular communication without having to use the additional identifier. Alternatively, transmission may be performed by specifying channel information for a corresponding supported service by considering a wireless environment. For example, corresponding channel information may be transmitted after specifying D2D communication to 1 and cellular communication to 0, or may be indicated in a bitmap format sequentially and then transmitted in a format of including a management result.

A D2D communication UE and a cellular communication UE are confirmed by including the UE1 and the eNB which receives the D2D uplink symbol through the D2D communication resource, and scheduling is performed by considering an available resource. In addition, the allocated resource is transmitted to the UE according to scheduling considering a communication status in a cell (steps 340 and 345). Therefore, the UE1 and the UE2 perform direct communication between the UEs by using the allocated resource (step 350). In this case, a resource for D2D communication may be changed, or may be the same as before.

Meanwhile, in order to perform D2D communication in a licensed band within the coverage of the eNB, synchronization between transmitting/receiving UEs of the D2D link and time and frequency synchronization between the eNB and a transmitting end of the D2D link must be matched. If synchronization of a receiving end of the D2D link is different from synchronization of a transmitting end, a signal cannot be restored, and if synchronization of a D2D transmitting end is different form synchronization of the eNB, interference may occur between a device to base station (D2B) or base station to device (B2D) link communicating with the eNB and another D2D link. That is, orthogonality between resources allocated for communication cannot be ensured.

Moreover, there is a method in which a D2D transmitting end periodically sends a reference signal for synchronization as one method of persistently achieving the synchronization. This method is used in the legacy LTE to achieve downlink synchronization. More specifically, in LTE, a signal for synchronization is a primary synchronization signal (PSS) and a secondary synchronization signal (SSS), and these two signals are sent with an interval of 5 ms. This method is appropriate in a downlink through which an eNB sends a signal to all UEs in a cell, but has a problem in that too many resources for synchronization are allocated in a situation where a transmitting end exists for each D2D link. Further, when using this method, there is another problem in that an additional reference signal is necessary to achieve synchronization with the eNB. Furthermore, as another method of persistently achieving the synchronization, there is a method in which a reference signal for synchronization is sent when establishing communication and thereafter timing synchronization tracking is performed by using a reference signal which plays several roles. In the legacy LTE or the like, a PRACH signal is used as the reference signal, and a sounding reference signal (SRS) is used for tracking timing synchronization at a later time. Although this method is directly applicable also for a D2D link, if it is directly applied, an SRS for D2D and an SRS for D2B must be separately defined, and in this case, there is a disadvantage in that many resources are used for tracking timing synchronization. For this, hereinafter, the present invention proposes a frame structure capable of effectively using a reference signal for synchronization tracking. In addition thereto, when each UE performs D2D in an uplink, the frame structure is designed by considering this situation since each UE has a different TA.

Further, the present invention proposes a method in which a reference signal for synchronization tracking is used together by a D2D link and a D2B link. For example, when a transmitting UE of the D2D link is the UE1 and a receiving UE is the UE2, a reference signal sent by the UE1 is used when the eNB determines a time advance (TA) of the UE1, and also the UE2 is synchronized to the UE1 by using this signal. In the present invention, for convenience, a reference signal used for synchronization tracking of the D2D link and the D2B link is called a synchronization signal (SS). The SS may be called another name, and in addition to a synchronization tracking function, estimating of a channel state, recognizing of proximity between UEs, location tracking of a UE, or the like may be performed. For example, an SRS of LTE may be applied as the SS. Hereinafter, the present invention can be utilized in a network or system in which D2B and/or D2D uses a synchronization tracking technique in UL and DL.

Figure 4:
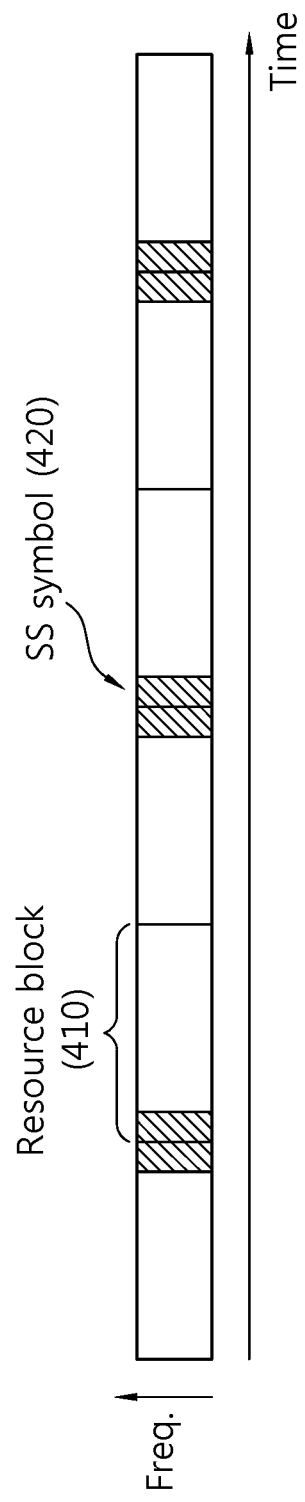
FIG. 4 illustrates a frame structure of a synchronization signal according to a first embodiment of the present invention.

FIG. 4 illustrates a frame structure of a synchronization signal according to a first embodiment of the present invention.

Referring to FIG. 4, an SS of a resource block corresponding to an odd-number order in a time axis is allocated to last symbols of the resource block, and an SS of a resource block corresponding to an even-number order is allocated to first symbols of the resource block. Alternatively, the SS of the resource block corresponding to the odd-number order may be allocated to the first symbols of the resource block, and the SS of the resource block corresponding to the even-number order may be allocated to the last symbol of the resource block. That is, in order to avoid an occurrence of inter-symbol interference caused by a TA difference between UEs, transmission is performed by carrying an SS signal only in ½ or less of first or last symbols of each resource block, and an SS of the first resource block and an SS of the last resource block are allocated to different subcarriers.

For example, if first symbols of a resource block of a UE1 are located in a $t^{th}$ time slot and an SS is sent in a $k^{th}$ subcarrier, it is allocated such that another UE cannot send the SS in a $(t-1)^{th}$ time slot by using the $k^{th}$ subframe. For example, if the last symbols of the resource block of the UE1 are located in the $t^{th}$ time slot and the SS is sent in the $k^{th}$ subcarrier, it is allocated such that another UE cannot send the SS in a $(t+1)^{th}$ time slot by using the $k^{th}$ subframe.

Figure 5:
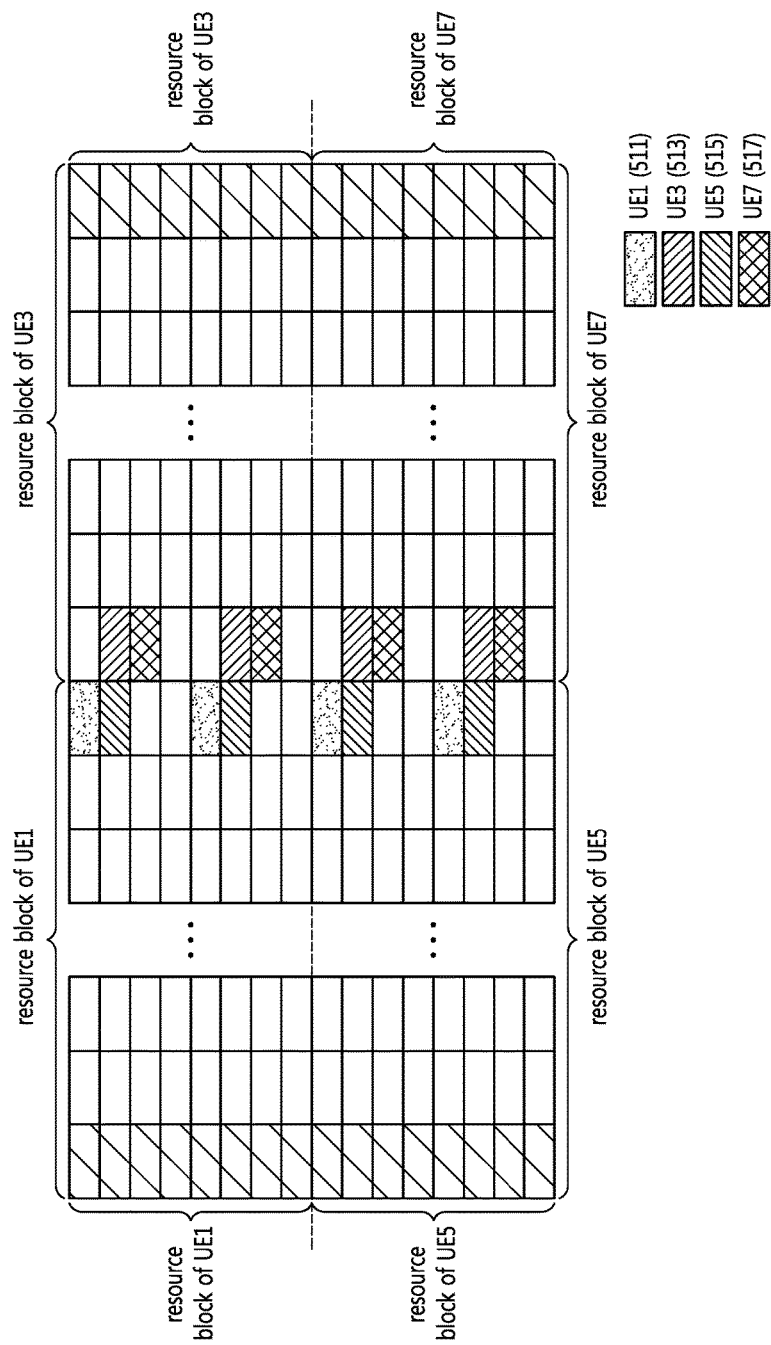
FIG. 5 illustrates mapping of a synchronization signal according to a first embodiment of the present invention.

FIG. 5 illustrates mapping of a synchronization signal according to a first embodiment of the present invention.

Referring to FIG. 5, a reserved area in which an SS is not sent is indicated by a slashed line 500, and corresponds to first symbols or last symbols of each resource block. The first or last symbols in which the SS is not sent in each resource block may be used as a guard symbol for sending data, or sending information to an eNB, or cancelling inter-symbol interference between D2D links.

Although an SS of a UE1 is present across resource blocks of the UE1 and a UE5, an allocation of the SS may be defined as described with reference to FIG. 4, that is, in such a manner that an SS signal only in ½ or less of first or last symbols of each resource block are carried and sent, and an SS of the first resource block and an SS of the last resource block are allocated to different subcarriers. Such an allocation can be optionally modified without an additional restriction. For example, all SSs of the UE1 may be present with an interval of one symbol in a resource block of the UE1, and an SS signal of the UE5 may be replaced with an SS signal of the UE1.

Meanwhile, if a receiving end of the UE1 is a UE2, when data is received in a last symbol, the UE2 may recognize a presence of interference caused by a UE3 in the symbol and a level of the interference. If the interference caused by the UE3 is great, the UE2 may request the UE1 or an eNB to send no signal in last symbols, or to send a signal to the eNB, or to move another resource block. If it is determined that the interference is not caused by the UE3, the UE2 may request the UE1 or the eNB to send data in last symbols. Further, if a receiving end of the UE3 is a UE4, the UE4 may examine a reception signal of first symbols of a signal to be received by the UE4 or the UE3 to perform the same operation as the UE2.

That is, if an SS symbol is allocated according to the first embodiment of the present invention, each receiving end may predict an amount of interference thereon caused by resource blocks located immediately before or after in a time axis and located immediately next in a frequency axis. Therefore, the prediction information (predicted interference amount) may be utilized to decrease the number of symbols which play a role of a guard, thereby effectively utilizing a resource of D2D transmission.

Figure 6:
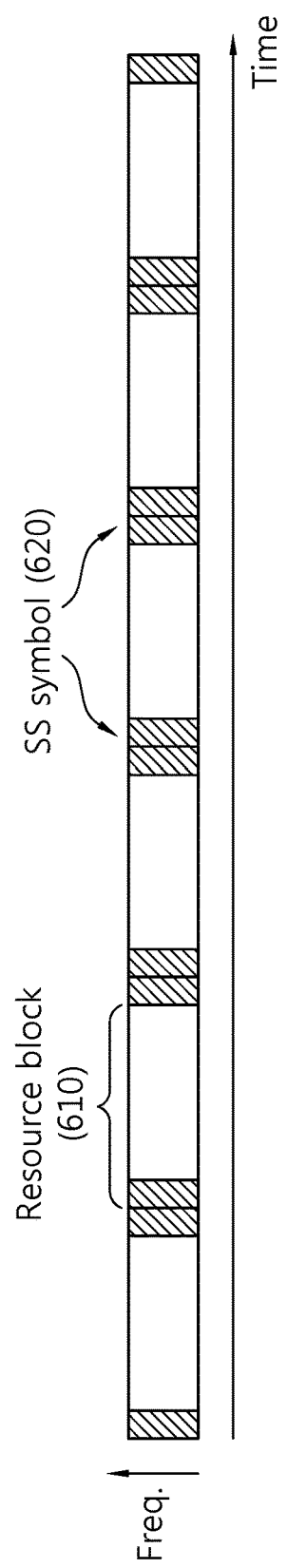
FIG. 6 illustrates a frame structure of a synchronization signal according to a second embodiment of the present invention.
Figure 7:
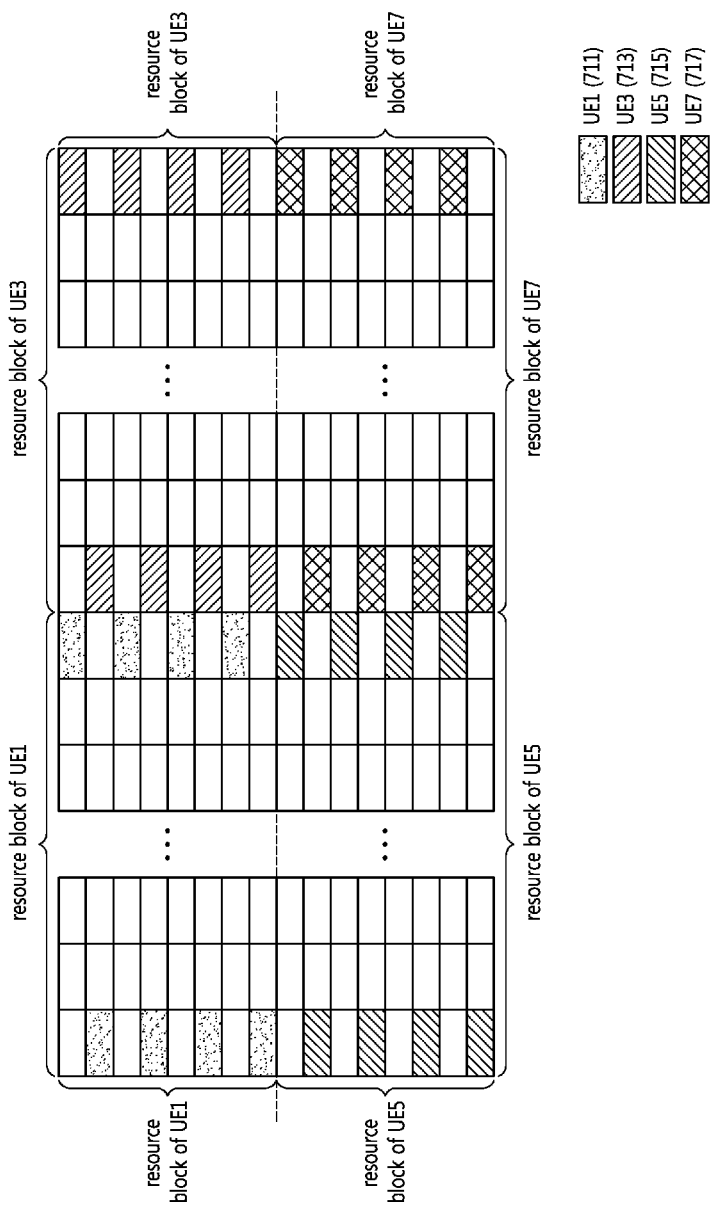
FIG. 7 illustrates mapping of a synchronization signal according to a second embodiment of the present invention.

FIG. 6 illustrates a frame structure of a synchronization signal according to a second embodiment of the present invention, and FIG. 7 illustrates mapping of a synchronization signal according to the second embodiment of the present invention.

Referring to FIG. 6, an SS for time tracking is allocated to first and last positions of a resource block. In order to avoid an occurrence of inter-symbol interference caused by a TA difference between UEs, transmission is performed by carrying an SS signal only in ½ or less of first or last symbols of each resource block, and an SS of the first resource block and an SS of the last resource block are allocated to different subcarriers.

For example, if first symbols of a resource block of a UE1 are located in a $t^{th}$ time slot and an SS is sent in a $k^{th}$ subcarrier, it is allocated such that another UE cannot send the SS in a $(t-1)^{th}$ time slot by using the $k^{th}$ subframe. For example, if the last symbols of the resource block of the UE1 are located in the $t^{th}$ time slot and the SS is sent in the $k^{th}$ subcarrier, it is controlled such that another UE cannot send the SS in a $(t+1)^{th}$ time slot by using the $k^{th}$ subframe. Additionally, an SS interval and allocation of each UE may change variously. Further, the SS may be utilized for other usages in addition to the tracking of timing synchronization.

For example, the SS may be allocated in a distributed manner in several subcarriers, and thereafter may be utilized to estimate a channel of subcarriers of a D2D link and then may be used in resource allocation. Further, the SS may be used when the eNB changes a TA of a D2D transmitting UE and estimates a channel of a D2B link. Information on the estimated D2B channel may be utilized to determine whether D2D will be changed to D2B and to determine a resource block to which the D2B link will be allocated when the D2D is changed to the D2B.

In addition thereto, since the UE2 which is a receiving end of the D2D link detects a signal of a subcarrier area of first or last symbols, it is possible to measure an amount of possible interference to the UE2 caused by the D2D link to which resource blocks continuous on a time or frequency axis are allocated. That is, the UE2 which is the receiving end of the UE1 may predict an amount of possible interference to the UE2 caused by a UE3, a UE5, and a UE7 which are transmitting ends of the D2D link. Further, if transmission is achieved by a UE9 in an immediately previous resource block on the time axis of a resource block to be received by the UE2, an amount of possible interference to the UE2 caused by the UE9 may be predicted.

Referring to FIG. 7, if a receiving end of the UE1 is the UE2, when data is received in a last symbol, the UE2 may recognize a presence of interference caused by the UE3 in the symbol and a level of the interference. If the interference caused by the UE3 is great, the UE2 may request the UE1 or the eNB to send no signal in last symbols, or to send a signal to the eNB, or to move another resource block. If it is determined that the interference is not caused by the UE3, the UE2 may request the UE1 or the eNB to send data in last symbols. Further, if a receiving end of the UE3 is a UE4, the UE4 may examine a reception signal of first symbols of a signal to be received by the UE4 or the UE3 to perform the same operation as the UE2.

Therefore, according to the present invention, each receiving end may predict an amount of interference thereon caused by resource blocks located immediately before or after in a time axis and located immediately next in a frequency axis. In addition, the prediction information may be utilized to decrease the number of symbols which play a role of a guard, thereby effectively utilizing a resource of D2D transmission.

Figure 8:
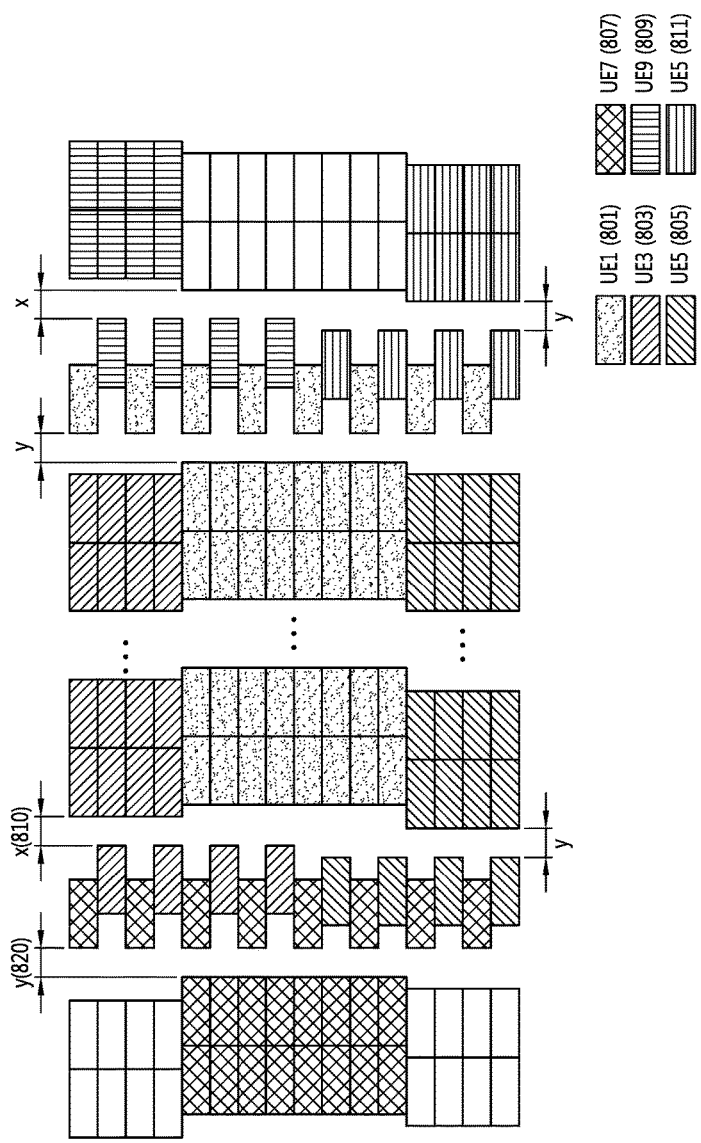
FIG. 8 and FIG. 9 illustrate mapping of a synchronization signal according to a third embodiment of the present invention.
Figure 9:
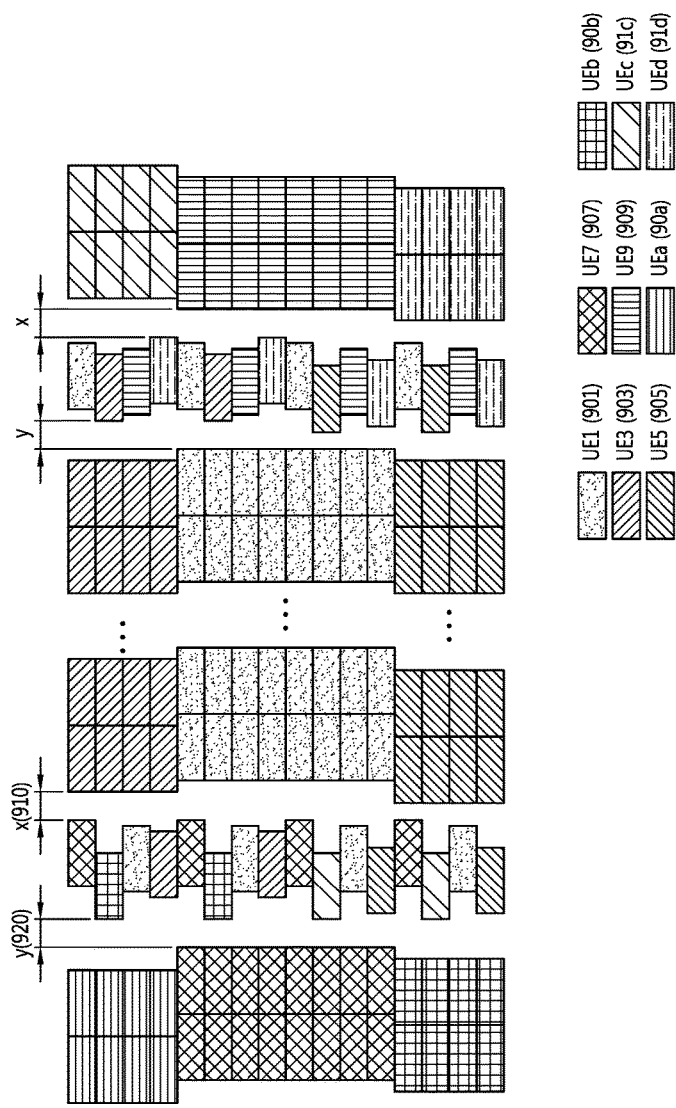

FIG. 8 and FIG. 9 illustrate mapping of a synchronization signal according to a third embodiment of the present invention.

Referring to FIG. 8, an SS is transmitted with an interval corresponding to any time from symbols for sending data. That is, if the SS is located in first symbols, SS symbols are transmitted x seconds earlier than data symbols, and if the SS is located in last symbols, the SS symbols are transmitted y seconds later than previous data symbols (or with an offset). In FIG. 8, a symbol marked by a UE k implies symbols allocated to the UE k (where k=1, 3, 5, 7, 9, 11). Further, it is assumed that the UE k is a transmitting UE, and a receiving UE of the UE k is a UE k+1. Furthermore, each UE may know or may not know x and y. The values x and y may be shared when a D2D link is established between the transmitting UE and the receiving UE or may be confirmed through a broadcasting signal by the use of an eNB.

According to the third embodiment, SS transmission is advantageously applicable to more various TA situations. For example, when the first and second embodiments are applied, if an SS of the UE k is located also outside a subcarrier for data of the UE k and a TA thereof is different from that of a different UE, interference may occur between the SS of the UE k and a data symbol of the different UE. Thus, if a TA of a UE5 is faster than a TA of a UE1 in FIG. 7, an SS of the UE5 may act as interference to the data symbol of the UE1. Therefore, according to the third embodiment of the present invention, if an SS is transmitted with a time interval with respect to first or last data symbols, the interference between the SS of the different UE and the data symbol can be avoided, and the advantage of the second embodiment can be directly applied.

Herein, offsets x and y for each symbol may be set differently for each UE, and may also be set identically. The values x and y may be set by an eNB on the basis of parameters such as a cell size, each UE's TA value, etc., and thereafter may be reported to each UE. Further, a period to be set may be randomly changed, and may be reported only in an initial stage and may not be reported thereafter. Furthermore, it may be determined by considering UE's mobility or by considering a synchronization difference between cells.

Additionally, FIG. 9 shows that an SS of a UE is allocated to one or more first symbols and last symbols of a resource block. That is, advantageously, it is easy to recognize interference to a receiving end caused by UEs which transmit a signal in resource blocks continuous in a time or frequency axis. For example, a receiving end UE2 may confirm a TA and a size of a signal sent by a UE7 907 by receiving a signal of $(1+4\ k)^{th}$ subcarriers of a resource block in a first SS transmission region. Further, the UE2 may confirm the TA and the size of the signal sent by the UE9 by receiving a signal of $(3+4\ k)^{th}$ subcarriers of a resource block in a last SS transmission region.

For example, the UE2 may measure an influence of possible interference to the UE2 caused by the UE3 and the UE5, by receiving signals of $4^{th}$ and $8^{th}$ subcarriers in the resource block in the first SS transmission region. In particular, if there is a UE which sends a signal in continuous subcarriers, since RF blocking may be caused when the UE is close to the UE2, this may be utilized to perform scheduling or to send a request to an eNB. Further, the UE2 may measure an influence of possible interference to the UE2 caused by the UE3 and the UE5, by receiving signals of $2^{nd}$ and $6^{th}$ subcarriers of the resource block in the last SS transmission region. As described above, a location of an SS symbol can be randomly changed while satisfying the aforementioned conditions in each method.

That is, each receiving end may predict an amount of interference thereon caused by resource blocks located immediately before or after in a time axis and located immediately next in a frequency axis. In addition, the prediction information may be utilized to decrease the number of symbols which play a role of a guard, thereby effectively utilizing a resource of D2D transmission.

Hereinafter, a process of performing an initial synchronization is described on the basis of the frame structure. For this, the present invention assumes a network system in which D2B and/or D2D uses a random access in UL, and includes establishing of one D2D link by the UE1 and the UE2. Hereinafter, a synchronization procedure will be described for example with reference to FIG. 10 to FIG. 13.

Figure 10:
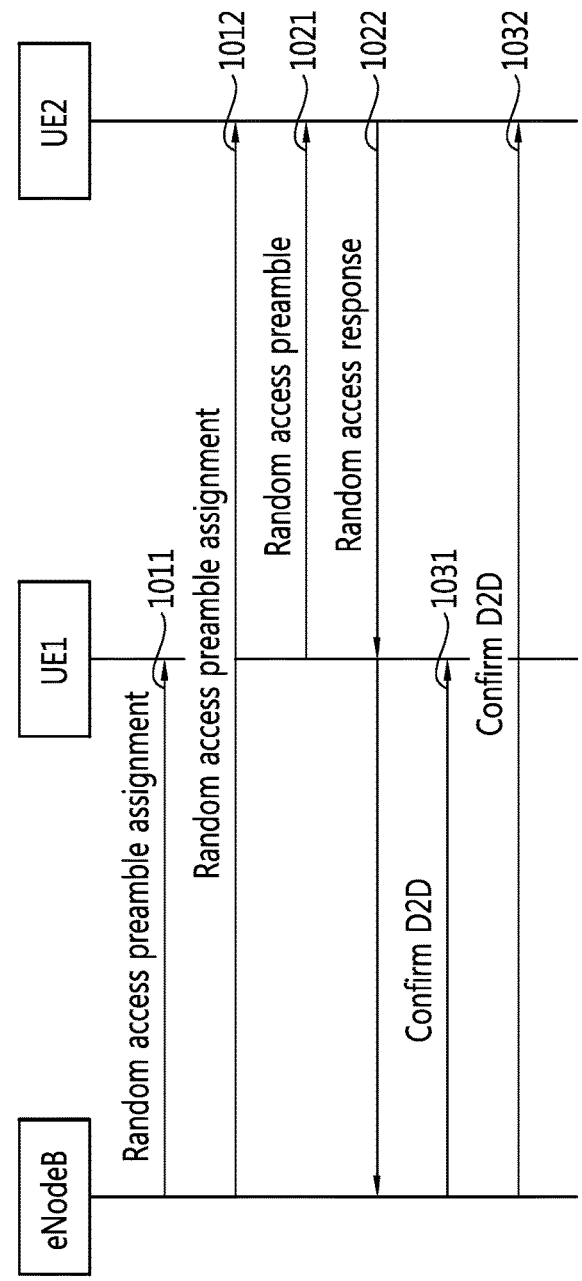
FIG. 10 is a flowchart illustrating signaling of a synchronization procedure according to a first embodiment of the present invention.

FIG. 10 is a flowchart illustrating signaling of a synchronization procedure according to a first embodiment of the present invention. A process of recognizing an initial synchronization and an initial channel state is defined herein when a UE1 and a UE2 belong to the same eNB. A random access response to be sent by the UE2 may be transmitted only to the eNB, or may be transmitted to both of the eNB and the UE1. A PRACH of the legacy LTE may be re-utilized as the random access preamble, or a new preamble may be included.

Referring to FIG. 10, the eNB reports assignment of the random access preamble to the UE1 and the UE2 (steps 1011 and 1012). In this case, sharing of preamble information for determining D2D communication between the UEs is included. More specifically, the eNB1 assigns a preamble to be transmitted to the UE2 by the UE1 (step 1011), and provides a preamble to be used in the UE1 as assignment information regarding the preamble to be sent to the UE2 by the UE1 (step 1012). In this case, reporting of an uplink channel of the UE1 may be included. Herein, offsets x and y for each symbol may be provided according to the present invention. The offset value may be set differently for each UE, and may also be set identically. Therefore, the eNB may define the offsets x and y by considering each UE's TA value or the like, and may report a location of SS allocation based thereon to each UE.

The UE1 transmits the preamble as data through the uplink channel by using the allocation information to the UE2 (step 1021). In addition, the UE2 transmits a response message for the preamble to the UE1 through an uplink channel of the UE2. In this case, the response message including channel information regarding a link between the UE1 and the UE2 may be transmitted to the UE1, and this may be provided to the eNB (step 1022).

Upon receiving the channel information for the link between the UE1 and the UE2 or the response message for the preamble, the eNB confirms that a D2D link is normally established between the UE1 and the UE2, and provides approval for D2D (steps 1031 and 1032). In this case, a confirmation message for the D2D may be indicated through the preamble used in the PRACH procedure. Therefore, the UE1 and the UE2 may transmit/receive a synchronization signal for D2D communication according to the determined offset or SS allocation information.

Figure 11:
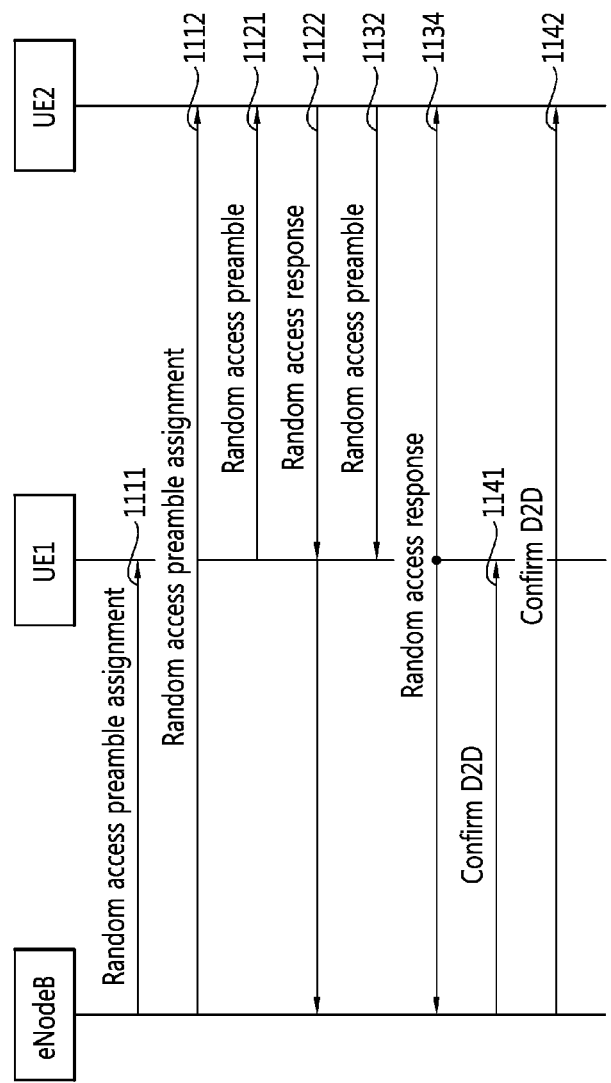
FIG. 11 is a flowchart illustrating signaling of a synchronization procedure according to a second embodiment of the present invention.

FIG. 11 is a flowchart illustrating signaling of a synchronization procedure according to a second embodiment of the present invention. In this case, a procedure for recognizing initial synchronization and an initial channel state is provided when a UE1 and a UE2 which perform D2D communication belong to the same eNB and establish a bidirectional link. Herein, a random access response to be sent by the UE2 (or UE1) may be transmitted only to the eNB, or may be transmitted to both of the eNB and the UE1 (or UE2). A PRACH of an LTE system may be re-utilized as the random access preamble, or a new preamble may be applied.

Referring to FIG. 11, the eNB reports assignment of the random access preamble to each of the UE1 and the UE2 (steps 1111 and 1112). The eNB allocates to the UE1 a preamble to be sent by the UE1 to the UE2, and reports information on a preamble to be sent by the UE2 to the UE1. In this case, an uplink channel of the UE2 may be provided (step 1111). In addition, the eNB allocates to the UE2 a preamble to be sent by the UE2 to the UE1, and reports information on a preamble to be sent by the UE1 to the UE2. In this case, an uplink channel of the UE1 is reported (step 1112).

The UE1 transmits the preamble of the UE1 to the UE2 through the uplink channel allocated to the UE1 by using the allocation information (step 1021). In addition, the UE2 transmits a response message for the preamble to the UE1 through the uplink channel of the UE2. In this case, the UE2 may transmit a response message further including channel information regarding a link with respect to the UE1 to the UE1 and the eNB (step 1122).

In addition, the UE2 transmits the preamble of the UE2 to the UE1 through the uplink channel allocated to the UE2 by using the allocation information (step 1132). In addition, the UE1 transmits a response message for the preamble to the UE2 through the uplink channel of the UE1 (step 1134). In this case, the UE1 may transmit a response message further including channel information regarding a link with respect to the UE2 to the UE2 and the eNB.

Upon receiving the channel information for each link between the UE1 and the UE2 or the response message for each preamble, the eNB confirms that a D2D link is normally established between the UE1 and the UE2, and provides approval for D2D (steps 1141 and 1142). In this case, a confirmation message for the D2D may be indicated through a preamble used in the PRACH procedure.

Figure 12:
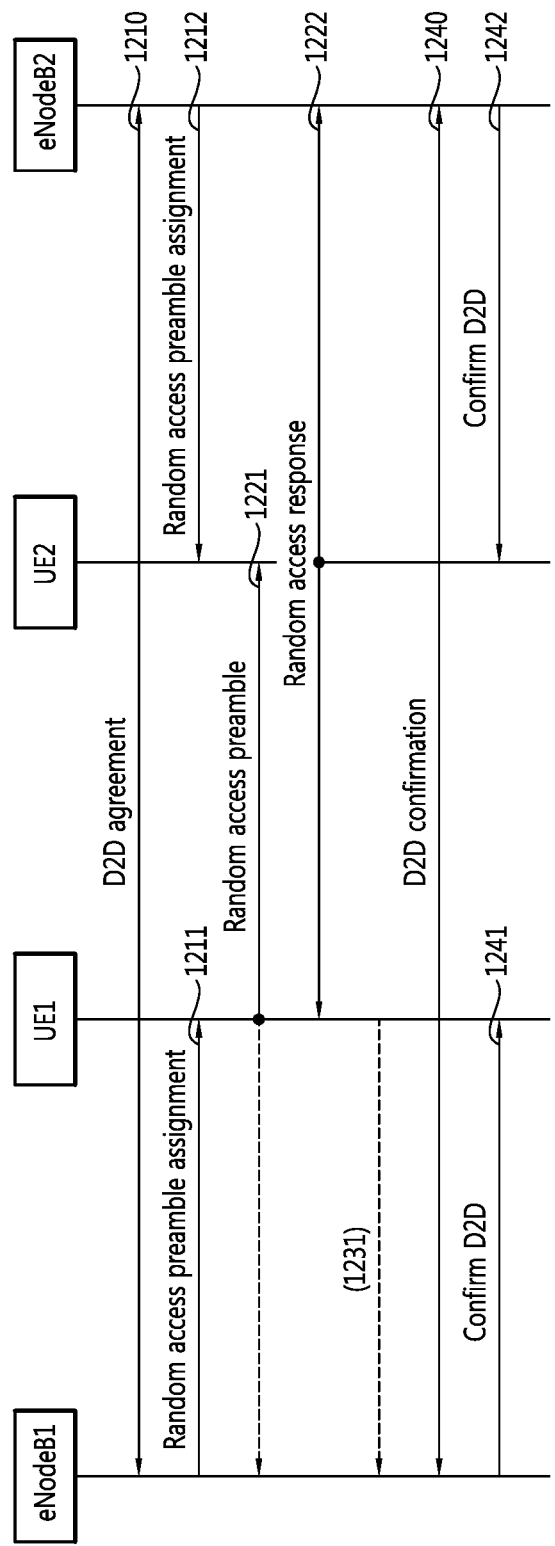
FIG. 12 and FIG. 13 are flowcharts illustrating signaling for performing device to device (D2D) communication according to the present invention.
Figure 13:
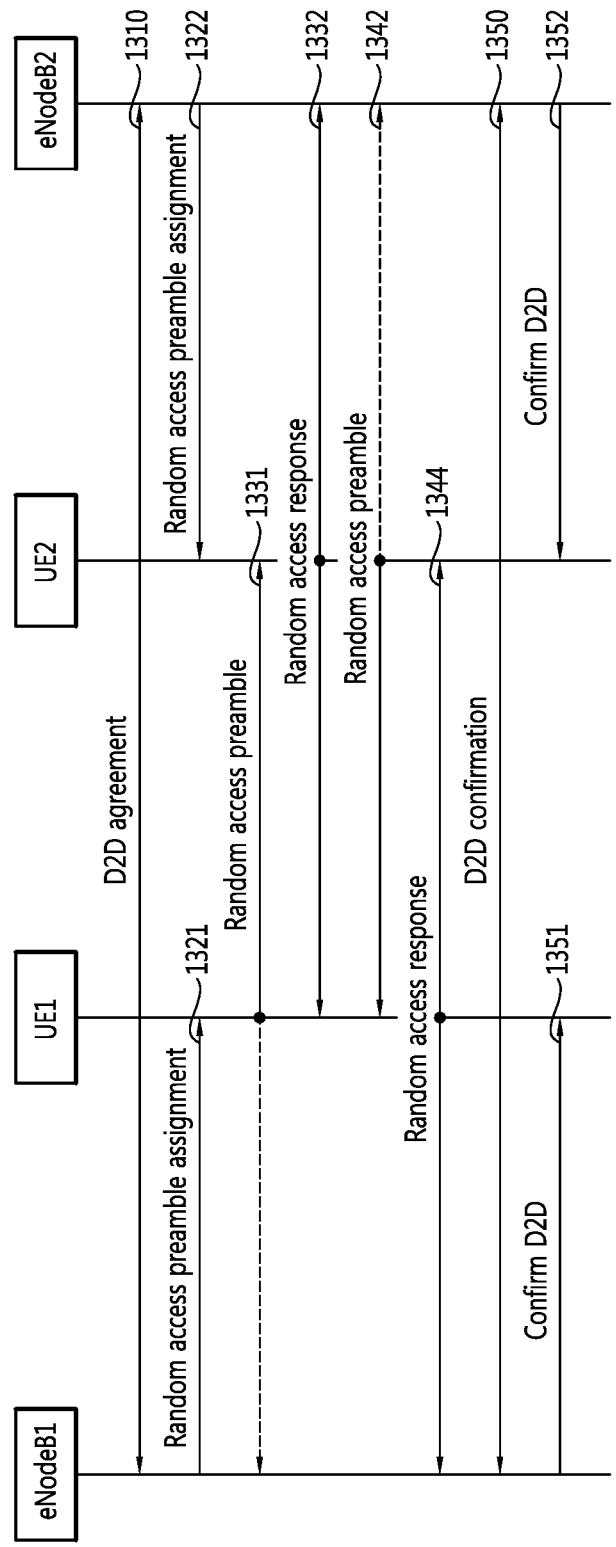

FIG. 12 and FIG. 13 show a procedure for setting initial synchronization when each UE belonging to a different eNB establishes a D2D link.

Referring to FIG. 12, this is a case where a UE1 and a UE2 belong to different eNBs and establish a unidirectional link. A random access response to be sent by the UE2 may be transmitted only to an eNB2, or may be transmitted to both of the eNB2 and the UE1. After the UE1 receives the random access response from the UE2, corresponding information may be relayed to the eNB or may not be provided. A PRACH of the legacy LTE may be re-utilized as the random access preamble in use, or a new preamble may be provided.

An eNB 1 and the eNB2 are in a state of being agreed to D2D communication (step 1210) Each eNB reports assignment of the random access preamble to a corresponding UE (steps 1211 and 1212). In this case, sharing of preamble information for determining D2D communication between the UEs is included. More specifically, the eNB1 assigns a preamble to be transmitted to the UE2 by the UE1 (step 1211). In addition, the eNB2 provides a preamble to be used in the UE1 as assignment information regarding the preamble to be sent to the UE2 by the UE1, and provides an uplink channel of the UE1 (step 1212).

Thus, the UE1 transmits the preamble through the uplink channel by using the assignment information to the UE2 (step 1221). In addition, the UE2 transmits a response message for the preamble to the UE1 through an uplink channel of the UE2. In this case, the response message including channel information regarding a link between the UE1 and the UE2 may be transmitted to the UE1, and this may be provided to the eNB2 (step 1222). In this case, upon receiving the response message, the UE1 may provide a response message including channel information regarding the link between the UE1 and the UE2 to the eNB1.

Accordingly, the eNB1 confirms that a D2D link is normally established between the UE1 and the UE2, and reports D2D confirmation to the eNB2. In this case, since the eNBs are connected through an X2 interface, approval for D2D scheduling may be provided more accurately (step 1240). Thus, the eNB1 and the eNB2 provide approval for D2D respectively to the UE1 and the UE2 (steps 1241 and 1242). Each eNB transmits a D2D confirmation message to a UE belonging thereto to report this.

Meanwhile, in FIG. 13, synchronization and an initial channel state are provided when the UE1 and the UE2 belong to different eNBs and establish a bidirectional link. A random access response to be sent by the UE2 (or UE1) may be transmitted only to an eNB, or may be transmitted to both of the eNB and the UE1 (or UE2). After the random access response is received by the UE1 from the UE2 (or by the UE2 from the UE1), corresponding information may be relayed to the eNB or may not be provided. A PRACH of the legacy LTE may be re-utilized as the random access preamble used in this method, or a new preamble may be provided.

An eNB 1 and the eNB2 are in a state of being agreed to D2D communication (step 1310). Each eNB reports assignment of the random access preamble to a corresponding UE (steps 1321 and 1222). In this case, sharing of preamble information for determining D2D communication between the UEs is included. More specifically, the eNB1 assigns a preamble to be transmitted to the UE2 by the UE1, provides a preamble to be used in the UE2 as assignment information regarding a preamble to be sent to the UE1 by the UE2, and provides the uplink channel of the UE2 (step 1321). In addition, the eNB2 assigns a preamble to be transmitted to the UE1 by the UE2, provides a preamble to be used in the UE1 as assignment information regarding a preamble to be sent to the UE2 by the UE1, and provides the uplink channel of the UE1 (step 1322).

Thus, the UE1 transmits the preamble through the uplink channel by using the assignment information to the UE2 (step 1331). In addition, the UE2 transmits a response message for the preamble to the UE1 through the uplink channel of the UE2 (step 1332). In this case, the response message including channel information regarding a link between the UE1 and the UE2 may be transmitted to the UE1, and this may be provided to the eNB2 (step 1322).

Meanwhile, the UE2 transmits the preamble to the UE1 through the assigned uplink information (step 1342). Thus, the UE1 transmits a response message for the preamble to the UE2 through the uplink channel of the UE1 (step 1344). In this case, the response message including the channel information from the UE2 to the UE1 may be transmitted to the UE2, and this may be provided to the eNB1 (step 1344).

Each eNB1 confirms channel information provided from the UE belonging thereto, and exchanges information on a D2D confirmation. The eNB1 may provide the information on the D2D confirmation to the eNB2, and the eNB2 may provide the information on the D2D confirmation to the eNB1. Since the eNBs are connected through an X2 interface, approval for D2D scheduling may be provided more accurately (step 1350). Therefore, each eNB may report to each UE that a configuration for each D2D communication is complete. That is, the eNB1 provides a D2D approval message to the UE1 (step 1351), and the eNB2 provides a D2D approval message to the UE2 (step 1352).

Figure 14:
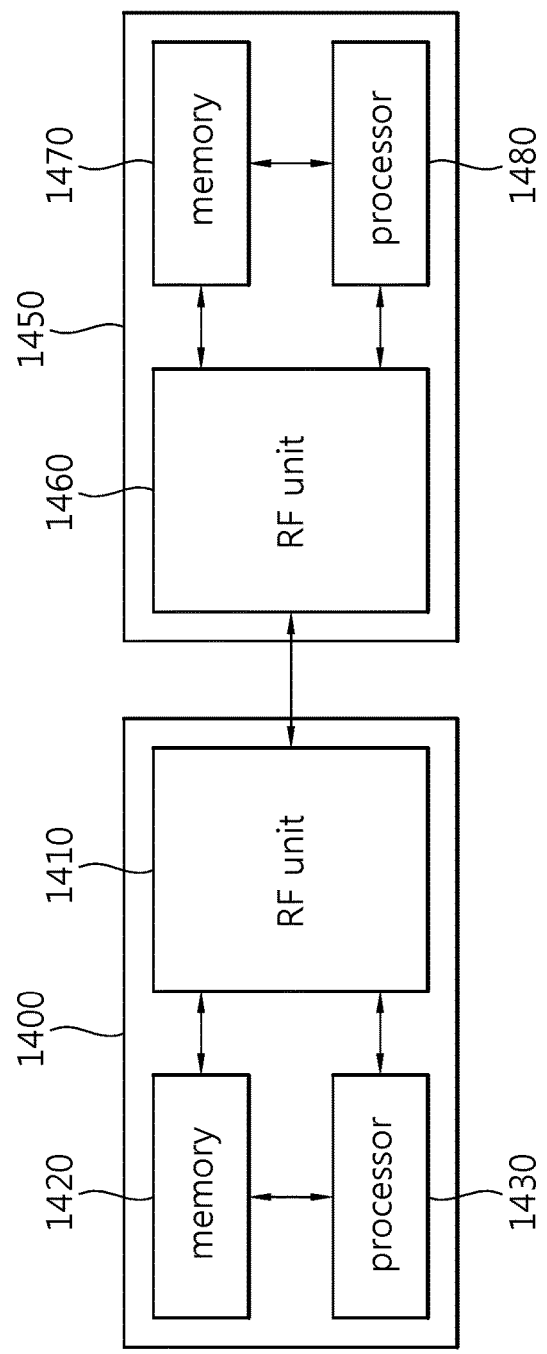
FIG. 14 is a block diagram illustrating a structure of a wireless communication system in brief according to the present invention.

FIG. 14 is a block diagram illustrating a structure of a wireless communication system in brief according to the present invention.

Referring to FIG. 14, a UE 1400 includes a radio frequency (RF) unit 1410, a memory 1420, and a processor 1430. The RF unit 1410 is coupled to the processor 1430, and transmits/receive a radio signal.

As an entity for performing a function, procedure, method, or the like according to the present invention, the processor 1430 performs the operations of FIG. 2 to FIG. 13 of the present invention. In particular, the processor 1430 according to the present invention may receive configuration information and resource allocation information instructed from a network as a higher-layer system, and may support both or one of a D2D communication access and a cellular communication access according to UE capability. In this case, the processor 1430 may perform communication with a different D2D UE by detecting a link for performing D2D communication without singling of an eNB.

In particular, according to the present invention, the processor 1430 confirms a resource allocated to perform D2D communication.

The resource for D2D communication includes an uplink transmission symbol duration having a predetermined length which is defined to minimize interference with a symbol for performing cellular communication and inter-symbol interference caused by a UE to which a different D2D link is established. Alternatively, the determined length is variable, and may include a guard symbol. Further, a resource allocation may be inferred by receiving an allocation period and interval (offset) of a D2D communication symbol and a cellular communication symbol. Herein, the allocation period may include information such as a length of a D2D communication symbol, a location of a start/end symbol, and a difference value with respect to the cellular communication symbol.

In particular, a PRB is confirmed for an SS determined to avoid inter-symbol interference caused by a TA difference between UEs and determined to be allocated to different subcarriers in order to perform transmission by carrying an SS signal only in ½ or less of first or last symbols of each resource block, and an SS of a first resource block and an SS of a last resource block are allocated to different subcarriers. For example, a resource for the SS signal is allocated to a first or last symbol of a resource block corresponding to an odd-number order in a time axis or a last or first symbol of a resource block corresponding to an even-number order. In this case, an allocation location of the SS signal is adjusted by considering offset information corresponding to each UE.

Therefore, the processor 1430 controls to transmit D2D uplink control information to the eNB in a symbol duration having the predetermined length. In this case, since the D2D uplink symbol is transmitted through the D2D communication resource, it does not act as interference to a symbol performing different D2D communication. In this case, modulation and transmission power for the D2D uplink symbol to be transmitted to the eNB may be set to a value different from a value which is set to a symbol for cellular communication. This value varies depending on a configuration of the eNB.

Alternatively, according to the present invention, the processor 1430 may apply a TDD scheme to perform D2D communication in a predetermined subframe on the basis of a GP of a special subframe, that is, with a time delay earlier or later by N OFDM symbols after the GP. In this case, the delay of N OFDM symbols may be determined by the eNB. Further, TDD configuration information may also be determined through RRC of the eNB.

In other words, the processor 1430 uses a resource configured for D2D communication to transmit/receive D2D data with respect to a different UE, and provides scheduling efficiency for a channel state of D2D communication and a later service by transmitting a D2D uplink symbol to the eNB in a symbol having a predetermined length. Further, the D2D uplink symbol may include BSR or start/end information as information regarding whether to continue a service of the D2D communication. Furthermore, information on a channel state for D2D communication or the like may be included. Furthermore, information on a request for switching to cellular communication may be further included. Additionally, information on a transmission period of the D2D uplink symbol may also be included.

The memory 1420 is coupled to the processor 1430, and includes information for supporting all operations of the processor 1430.

Meanwhile, a network 1450 includes an RF unit 1460, a processor 1480, and a memory 1470. The RF unit 1460 is coupled to the processor 1480, and transmits/receives a radio signal. Herein, the network may be configured such that some entities of the eNB and some entities of a higher-layer core network are partially supported according to an operation thereof. That is, the processor 1480 of the network according to the present invention performs the operations of FIG. 2 to FIG. 13 of the present invention as an entity for performing the function, procedure, and method according to the present invention. That is, resources are allocated by considering capability information of UEs in a cell, a service state, a channel state, etc. In particular, resources are allocated alternately by distinguishing a resource for D2D communication according to the present invention and a subframe for cellular communication, or allocation information and offset information for each resource block and determined for each UE are allocated to avoid an occurrence of inter-symbol interference caused by a TA difference between UEs. Therefore, it is controlled to confirm an allocation location of an SS signal between D2D UE pairs for each UE or for each service. Further, a configuration for a modulation scheme and power for a D2D uplink symbol for any region of a resource for D2D communication may be notified. Furthermore, a transmission period or the like of the D2D uplink symbol may be configured. Alternatively, information on an allocation between the cellular communication symbol and the D2D communication symbol may be provided so that the UE can predict an allocation rule. For example, information may be provided such as an allocation length of a D2D communication resource, a location of a start symbol/end symbol, and a separation distance with respect to a cellular communication resource.

The memory 1470 is coupled to the processor 1480, and includes information for supporting all operations of the processor 1480.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation, and do not intend to limit technical scopes of the present invention. Therefore, the scope of the invention is defined not by the detailed description of the invention but by the appended claims, and all differences within the scope will be construed as being included in the present invention.

What is claimed is:

1. A method for performing timing synchronization in a wireless communication system, the method comprising:
   transmitting, to an evolved NodeB (eNB), user equipment (UE) capability information comprising an ability of supporting device-to-device (D2D) communication;
   receiving, from the eNB, resource information indicating that a first resource for D2D UEs and a second resource for a cellular UE are allocated alternately with each other;
   transmitting a synchronization signal before x symbols than first symbols of the first resource or after y symbols than last symbols of the first resource, wherein the x symbols and the y symbols are determined by a time offset value; and
   acquiring synchronization between the D2D UEs by using the synchronization signal,
   wherein the first resource is determined by considering the number of the D2D UEs and a size of a cell coverage of the eNB, and comprises the time offset value,
   wherein data is transmitted through the first resource,
   wherein the synchronization signal is transmitted in a subcarrier location out of a subcarrier location of the first resource, and
   wherein the time offset value is defined by considering the size of the cell coverage of the eNB and timing advance (TA) value of each of the D2D UEs.

2. The method of claim 1, wherein the resource information further comprises frequency offset information indicating a first subcarrier location of the synchronization signal transmitted before the x symbols than the first symbols and a second subcarrier location of the synchronization signal transmitted after the y symbols than the last symbols, and
   wherein the first subcarrier location and the second subcarrier location are different from each other.

3. The method of claim 1, further comprising predicting interference between the D2D UEs supporting a service and other D2D UEs supporting other service which is different from the service by using the received resource information.

4. The method of claim 3, further comprising requesting a change of the first resource to the eNB on the basis of information on the predicted interference.

5. The method of claim 4, further comprising, if it is determined that the predicted interference is greater than a predetermined threshold, requesting the change of the first resource of the first resource to the eNB so that the synchronization signal is not transmitted in at least one symbol location between the first and last symbols.

6. The method of claim 1, wherein the D2D UEs include a transmitting D2D UE and a receiving D2D UE,
   wherein the transmitting D2D UE transmits the synchronization signal before the x symbols than the first symbols or after the y symbols than the last symbols by applying the time offset value, and
   wherein the receiving D2D UE receives the synchronization signal before the x symbols than the first symbols or after the y symbols than the last symbols by applying the time offset value.

7. The method of claim 6, wherein the synchronization signal is transmitted to the eNB before the x symbols than the first symbols or after the y symbols than the last symbols by applying the time offset value.

8. The method of claim 7, wherein the eNB adjusts a timing advance offset for synchronization when the eNB receives the synchronization signal.

9. The method of claim 1, wherein the resource information further comprises preamble information to be used between the D2D UEs, and
   wherein the preamble information is acquired through a random access procedure between the eNB and the D2D UE.

10. The method of claim 9, wherein the D2D UEs include a transmitting D2D UE and a receiving D2D UE,
    wherein the transmitting D2D UE transmits the synchronization signal including the preamble information before the x symbols than the first symbols or after the y symbols than the last symbols by applying the time offset value, and
    wherein the receiving D2D UE receives the synchronization signal the preamble information, and transmits a response message for the preamble information to the transmitting D2D UE.

11. The method of claim 10, wherein the transmitting D2D UE delivers the response message to the eNB.

12. The method of claim 11, wherein the transmitting D2D UE receives a D2D communication approval in response to the response message from the eNB.

13. An apparatus for performing timing synchronization in a wireless communication system, the apparatus comprising:
    a transceiver configured to transmit and receive a radio signal; and
    a processor coupled to the transceiver to determine allocated resource information,
    wherein the processor is configured to:
    control the transceiver to transmit, to an evolved NodeB (eNB), user equipment (UE) capability information comprising an ability of supporting device-to-device (D2D) communication, control the transceiver to receive, from the eNB, resource information indicating that a first resource for D2D UEs and a second resource for a cellular UE are allocated alternately with each other, control the transceiver to transmit a synchronization signal before x symbols than first symbols of the first resource or after y symbols than last symbols of the first resource, wherein the x symbols and the y symbols are determined by a time offset value, and acquire synchronization between the D2D UEs by using the synchronization signal, wherein the first resource is determined by considering the number of the D2D UEs and a size of a cell coverage of the eNB, and comprises the time offset value, wherein data is transmitted through the first resource, wherein the synchronization signal is transmitted in a subcarrier location out of a subcarrier location of the first resource, and wherein the time offset value is defined by considering the size of the cell coverage of the eNB and timing advance (TA) value of each of the D2D UEs.

* * * * *